Sept. 21, 1948.    H. C. WILKENING    2,449,733
VALVE ACTUATING MECHANISM
Filed April 22, 1944
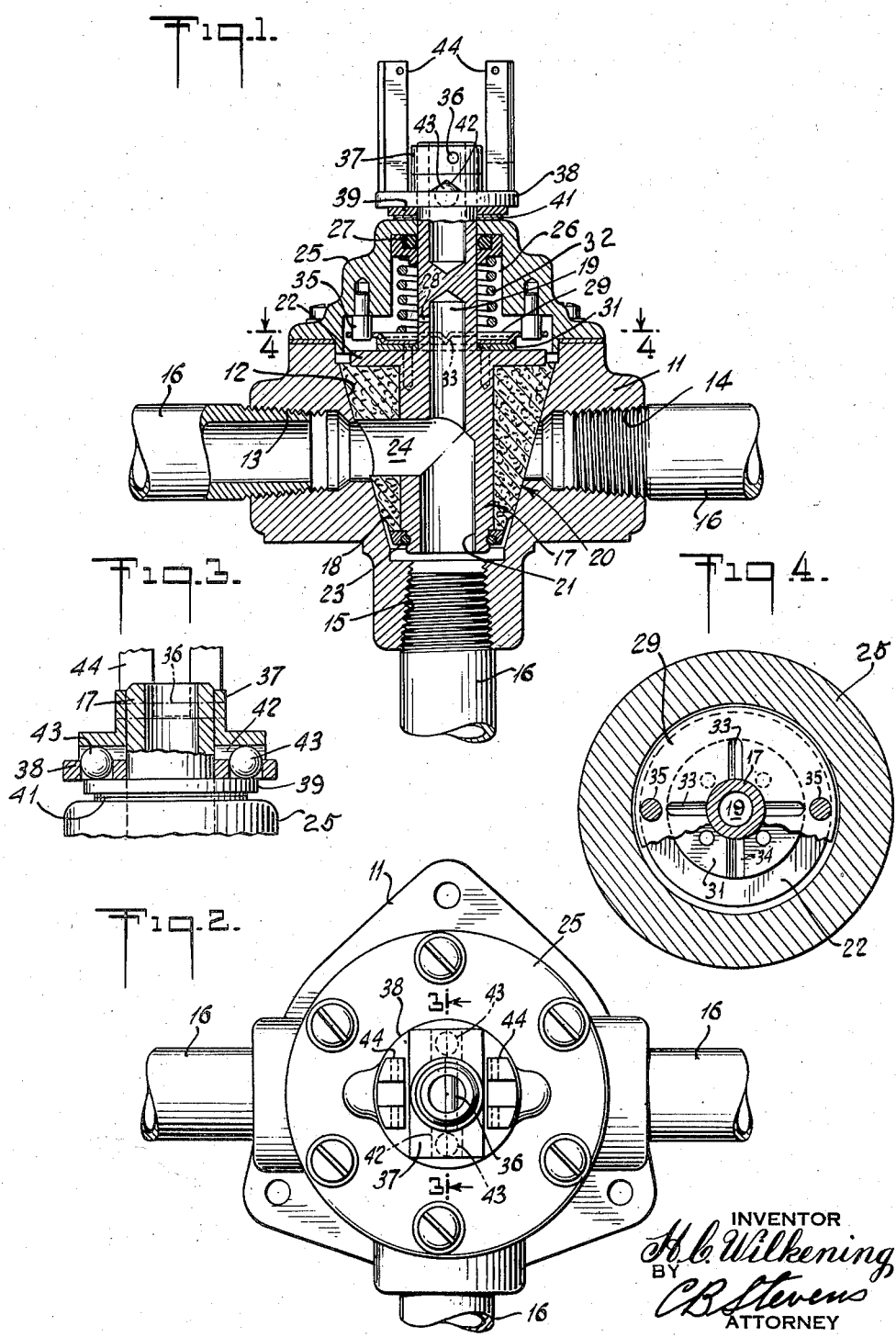

Patented Sept. 21, 1948

2,449,733

UNITED STATES PATENT OFFICE 2,449,733

VALVE ACTUATING MECHANISM

Herbert C. Wilkening, Dayton, Ohio, assignor to United Aircraft Products, Inc., Dayton, Ohio, a corporation of Ohio Application April 22, 1944, Serial No. 532,223

2 Claims. (Cl. 251—97)

This invention relates to valve mechanisms, for example fuel cocks for use in aircraft, and particularly to actuating means for obtaining axial and rotative movements of the valve.

Fuel cocks of the class described are interposed between the aircraft engine and the several fuel tanks supplying the engine, and it is their function selectively to communicate the tanks with the engine. Thus, when the fuel supply in one tank is exhausted, the operator may adjust the fuel cock to interrupt communication of the engine with the empty tank and establish a new connection with a fresh source of supply. Selection between the tanks is accomplished through variable rotative adjustment of a tapered plug type valve. Because the valve normally is pressed to a seated position considerable torque resistance is offered to turning movement thereof. Accordingly, the valve is difficult to operate and is subject to excessive wear. As a corrective measure it is the practice when operating the valve to impart first an axial lifting motion thereof from the valve seat and then a rotative motion to a new position of adjustment. In this manner the resistance of the valve to turning movement is lessened before a rotative impulse actually is delivered thereto. Since the fuel cock ordinarily is arranged for remote control, as a matter of convenience motion in only one sense is transmitted thereto. Means on the fuel cock are provided for converting the motion of single sense into successive axial and rotative movements of the valve. Conventionally the valve actuating means has a rotary motion, and camming and lost motion devices are utilized to effect the valve operations in the desired direction and sequence.

Such devices have heretofore been of a nature to add disproportionately to the complexity and cost of construction of the fuel cock, and have had a limited effect in reducing torque resistance. The present invention has for its object a general improvement of valve operating mechanisms of the prior art, and contemplates specifically a more simple and effective valve lifting device.

In carrying out that object there is produced a fuel cock valve lifter, characterized by a very few number of parts, all of which lend themselves to inexpensive production and easy assembly. A feature of the invention resides in a structure comprising adjacent relatively movable elements spring pressed into surface engagement, and complementary portions on the elements operable in response to rotary movement of one of the elements to effect successive motions of the other element, first in an axial direction and then in a rotary direction.

Other objects and structural details of the invention will appear from the following description when read in connection with the accompanying drawings, wherein:

Fig. 1 is a view in vertical longitudinal section of a fuel cock embodying the valve operating mechanism of the invention;

Fig. 2 is a top plan view of the fuel cock of Fig. 1;

Fig. 3 is a fragmentary view in longitudinal section, taken along the line 3—3 of Fig. 2; and Fig. 4 is a view in cross section, and partly broken away, of detent means associated with the valve, being taken substantially along the line 4—4 of Fig. 1.

Referring to Fig. 1 a fuel cock constructed in accordance with the present invention comprises a body 11 suitably adapted for mounting in the fuel system. The interior of the body 11 is bored to form a chamber 12 of a frusto-conical shape. A plurality of radial inlets, including openings 13 and 14, are disposed in the body and communicate with the chamber 12. In addition to the radial inlet openings there is a longitudinal opening 15, likewise communicating with chamber 12 and functioning as an outlet. As indicated, each of the inlet and outlet openings is internally threaded to receive tubing 16, connected respectively to individual fuel supply tanks and to the engine.

In order that fuel may be withdrawn selectively from the separate supply tanks there is disposed in chamber 12 a tapered plug type valve 20 comprised of an inner tubular shaft 17 and an outer cork member 18. The shaft 17 is longitudinally arranged in chamber 12 with one end thereof in substantial alignment with the outlet opening 15. An axial bore 19 is formed in shaft 17 and in the end of the shaft adjacent to opening 15 is a counterbore 21. The cork member 18 surrounds the shaft 17 and is held between an annular flange 22 midway along the shaft and a lock ring assembly 23 on the shaft. The cork member has a frusto-conical shape complementing the chamber 12 and frictionally engages the wall of the chamber. A radial port 24 is formed in the valve 20 by registering openings in the shaft 17 and member 18 and communicates with counterbore 21. Through rotation of the valve assembly the port 24 may be brought opposite selected inlet openings and establish communication between the selected inlet opening and outlet 15 to the exclusion of all the other inlet openings. The cork member 18, it will be observed, functions as a seal when in contact with the wall of chamber 12.

Closing that end of body 11 opposite outlet 15 is a cover plate 25. The cover plate 25 is bolted to the body 11 and is elevated at its center portion to define an internal chamber 26. The shaft 17 extends through the chamber 26 and has a bearing in a central opening in the cover plate. A seal assembly 27 surrounds the shaft inside the cover plate and prevents the escape of fluid along the shaft. Communication between the chamber 26 and valve shaft counterbore 21 is provided by bore 19 and a radial port 28. Within the chamber 26 is indexing or detenting mechanism by which the valve is yieldingly arrested in any of its rotative positions of adjustment. This mechanism may be conventional in construction, and, as here disclosed, comprises discs 29 and 31 surrounding the shaft 17 immediately above flange 22 thereof. Disc 31 rests on the flange 22 and is engaged by disc 29 which is pressed downward by a compression spring 32 interposed between the disc assembly and the seal 27. As shown in Fig. 4, detents 33 on one of the discs 29 and 31 may be engaged and disengaged with sets of complementary notches 34 in the other of the discs by relative movement between the discs. The disc 29 functions as the stationary part of the detent mechanism, being held fixed with respect to the cover plate 25 by studs 35 which pass through peripheral openings in the disc into inwardly facing plate recesses. The disc 31 is secured to and movable with the shaft 17. The spring 32, in addition to effecting engagement of the detent discs 29 and 31, presses the entire valve assembly to a seated position in chamber 12 in a manner to seal the several inlet and outlet openings from undesired communication with each other.

Outside the valve body there is secured to the shaft 17, as by a pin 36, a head 37. The head 37 is generally rectangular in shape (see Fig. 2) with a central opening receiving the shaft 17. Surrounding the shaft 17 between head 37 and the cover plate 25 are an actuating ring 38 and a spacing assembly comprising a washer 39 and shims 41, the latter resting on the cover plate 25. The action of spring 32 in pressing the valve actuating shaft 17 axially inward tends to effect a surface engagement of the head 37 with the actuator 38. In the under surface of the head 37 are diametrically opposed grooves 42. Adapted to engage in the respective grooves 42 are balls 43 carried by the actuator 38 in spaced holes therein (see Fig. 3). The balls 43 ride on the washer 39 and are prevented thereby from dropping out of position. Thus, in response to rotary movement of the actuator 38 relative to the shaft 17, the balls 43 act on the sides of the groove 42 with a camming action and effect axial movement of the head 37 and associated parts in an outward or lifting direction. Relative rotary motion of the actuator is limited by integrally formed lugs 44 thereon stationed on opposite sides of the head 37. The lugs 44 are spaced slightly from the sides of the head 37 so that they are without effect on the head during the initial rotary movement of the actuator. Upon contact of the lugs 44 with the head 37, however, continued rotary motion of the actuator is imparted to the valve actuating shaft 17.

As seen in Fig. 2, the lugs 44 have a bifurcated construction, allowing a lever or like operating means to be supported therebetween.

In the operation of the fuel cock, when it is desired to change the adjustment of the valve 20 from a position interconnecting one of the spaced radial inlets and the outlet 15 to a position interconnecting another of the inlets and the outlet, the actuator 38 is turned through the degrees of movement necessary to move the valve to its newly selected position of adjustment. During its initial rotative movement the actuator moves relatively to the shaft 17, and, through the coaction of the balls 43 and grooves 42 in head 37, raises the shaft to lift the valve slightly from its seat in chamber 12. Torque resistance, due to the frictional engagement of the valve with the wall of chamber 12, thereby is relieved, and the valve is permitted to turn easily with the actuator 38 as continued movement of the actuator causes the lugs 44 thereon to contact head 37. Arrival of the valve in successive positions of adjustment is signaled by the settling of detents 33 into the complementary notches 34.

What is claimed is:

1. In a fluid distributing mechanism having a body and a valve in said body movable in rotary and axial directions, said valve having an operating shaft extending from said body and through which shaft motion is imparted to said valve; actuating mechanism for said shaft including an angular head fixed to said shaft outside body; an actuator ring surrounding said shaft adjacent said head; spring means urging said actuator ring and said head into contacting relation; projecting lugs on said actuator ring arranged alongside said head and operative during rotary movement of said actuator ring to engage and turn said head and said shaft, said lugs occupying initially a position spaced from said head whereby a lost motion period intervenes between the start of rotary motion of said actuator ring and the time of engagement of said lugs with said head; and complementary cam means carried by said actuator ring and said head for effecting axial motion of said head and said valve operating shaft during said lost motion period, said means including rolling members carried by said ring, and grooves in said head receiving said rolling members.

2. In a fluid distributing mechanism having a multiported body providing a valve seat, a valve in said body on said valve seat, said valve being rotatably movable selectively to interconnect the ports in said body, and said valve being longitudinally movable toward and from frictional engagement with said valve seat; means pressing said valve toward frictional engagement with said valve seat; a valve operating shaft through which motion is imparted to said valve; a head of generally rectangular shape secured to said shaft; diametrically opposed grooves in a surface of said head; an actuator ring surrounding said shaft adjacent to said head; rolling members carried by said actuator ring and received in said diametrically opposed grooves, whereby relative rotary motion of said actuator ring serves to elevate said valve operating shaft to withdraw said valve from frictional engagement with the valve seat; and upstanding lugs on said actuator ring extending alongside said head and normally spaced therefrom, said lugs being engageable with said head following initial relative motion of said actuator ring whereby continued rotary movement of said ring effects a corresponding motion of said shaft.

HERBERT C. WILKENING.

REFERENCES CITED

The following references are of record in the file of this patent:

UNITED STATES PATENTS

| Number | Name | Date |
|---|---|---|
| 2,046,266 | Huhn | June 30, 1936 |
| 2,233,840 | Koehler | Mar. 4, 1941 |

FOREIGN PATENTS

| Number | Country | Date |
|---|---|---|
| 69,396 | Germany | June 27, 1893 |
| 783,861 | France | Apr. 15, 1935 |